United States Patent [19]
Sand et al.

[11] Patent Number: 5,651,667
[45] Date of Patent: Jul. 29, 1997

[54] CRYOPUMP SYNCHRONOUS MOTOR LOAD MONITOR

[75] Inventors: William T. Sand, Attleboro; Martin Stein, Bedford, both of Mass.

[73] Assignee: Helix Technology Corporation, Mansfield, Mass.

[21] Appl. No.: 183,692

[22] Filed: Jan. 18, 1994

Related U.S. Application Data

[63] Continuation of Ser. No. 775,808, Oct. 11, 1991, abandoned.

[51] Int. Cl.$^6$ .................................................. B01D 8/00
[52] U.S. Cl. ............................ 417/572; 318/432; 62/55.5
[58] Field of Search ..................... 417/901; 73/862.27, 73/862.28, 862.193; 318/432, 433, 434, 438

[56] References Cited

U.S. PATENT DOCUMENTS

| | | | |
|---|---|---|---|
| 3,867,678 | 2/1975 | Stoner | 318/432 |
| 4,066,942 | 1/1978 | Bardwell | 318/434 |
| 4,090,119 | 5/1978 | Griffith et al. | 318/432 |
| 4,433,276 | 2/1984 | Nola | 318/438 |
| 4,510,576 | 4/1985 | MacArthur et al. | 364/551 |
| 4,543,793 | 10/1985 | Chellis et al. | 62/6 |
| 4,562,389 | 12/1985 | Jundt et al. | 318/432 |
| 4,659,976 | 4/1987 | Johanson | 318/434 |
| 4,726,738 | 2/1988 | Nakamura et al. | 417/22 |
| 4,823,057 | 4/1989 | Eley | 318/432 |
| 4,831,873 | 5/1989 | Charbonneau et al. | 73/862.28 |
| 4,918,930 | 4/1990 | Gaudet et al. | 417/901 |
| 4,958,499 | 9/1990 | Haefner et al. | 417/901 |
| 4,987,358 | 1/1991 | Branam | 318/603 |
| 5,010,737 | 4/1991 | Okumura et al. | 62/6 |
| 5,073,862 | 12/1991 | Carlson | 364/551 |
| 5,239,874 | 8/1993 | Hale | 73/862.191 |

OTHER PUBLICATIONS

"Application Notes, Power Sensors and Load Controls," Load Controls Inc., pp. 1–15, (1986).
"Power Cell Power Transducers," Specification Sheet.
F. W. Bell, "Industrial Watt Transducers" Specification Sheet, (4 pages).

*Primary Examiner*—Wellington Chin
*Assistant Examiner*—Jean B. Corrielus
*Attorney, Agent, or Firm*—Hamilton, Brook, Smith & Reynolds, P.C.

[57] ABSTRACT

An apparatus and method for monitoring the torque load condition of a cryopump motor includes a power transducer for monitoring the electrical power input to the cryopump motor. A preferred embodiment of the power transducer includes a Hall-effect multiplier which measures the instantaneous and average electrical power input to the cryopump motor to determine torque load. Another preferred embodiment includes a power transducer which measures the Power Factor of the electrical power input to the cryopump motor to determine torque load. The Power Factor transducer includes a phase detector which detects the phase difference between the input voltage and the input current applied to the cryopump motor.

20 Claims, 5 Drawing Sheets

CRYOPUMP SYNCHRONOUS MOTOR LOAD MONITOR

This is a continuation of application Ser. No. 07/775,808 filed on Oct. 11, 1991, now abandoned.

BACKGROUND OF THE INVENTION

In various types of cryogenic refrigerators, or cryopumps, a working fluid such as helium is introduced into a cylinder, and the fluid is expanded at one end of a piston-like displacer to cool the cylinder. For example, in Gifford-McMahon type refrigerators working fluid under high pressure may be valved into the warm end of the cylinder. Then the fluid is passed through a regenerator by movement of the displacer. The fluid which has been cooled in the regenerator is then expanded at the cold end of the displacer.

The displacer movement may be controlled by a mechanical drive such as a rotary synchronous motor which drives the displacer through a rotary to linear crosshead. The crosshead converts the rotary motion of the motor to reciprocating motion which drives the displacer through a sinusoidal displacement cycle. The displacer may also be driven by a linear motor which directly drives the displacer though the displacement cycle.

Sufficient mechanical torque must be generated by the drive motor to drive the displacer through each refrigeration cycle. The instantaneous torque load on the motor depends on the refrigeration cycle and the mechanical condition of the refrigerator. If the instantaneous torque load on a synchronous motor reaches some threshold, i.e., the maximum attainable torque, the motor loses synchronization and pulls-out or "ratchets".

As the helium refrigerant in the system becomes contaminated through leakage and the like, there is an increased torque load on the synchronous motor. Mechanical wear of the cryogenic refrigerator components also tend to increase the torque load on the motor. Thus, with refrigerant contamination and mechanical wear the peak torque load on the motor increases. When the peak torque increases beyond the maximum attainable torque of the synchronous motor, the synchronous motor loses synchronization until the system moves into a lower region of the torque cycle, i.e., the motor is overloaded.

SUMMARY OF THE INVENTION

The present invention provides a non-invasive means for monitoring the torque generated by a cryogenic refrigerator motor and thereby detect mechanical wearing of components and contamination of refrigerant.

In general, in one aspect, the invention provides an apparatus and method for monitoring the condition of a cryopump motor using a torque load monitor for monitoring the mechanical torque developed in the cryopump motor. The torque load monitor includes a power transducer for monitoring the electrical power input to the cryopump motor.

Preferred embodiments include a power transducer, such as a Hall-effect multiplier, which produces an output signal representative of the instantaneous electrical power input to the cryopump motor. The output of the power transducer is passed through a low pass filter which produces an output signal representative of the short term average electrical power input to the cryopump motor.

In other preferred embodiments, a maximum signal detector detects the maximum signal level on the low pass filter output signal which is an indication of the maximum motor torque generated during a cryopump refrigeration cycle. A minimum signal detector detects the minimum signal level on the low pass filter output signal which is an indication of the "no load" power consumption of the cryopump motor. A level sensor subtracts the minimum detected signal level from the maximum detected signal level and produces an output signal which is an indication of the peak torque generated during a cryopump refrigeration cycle. An alarm circuit sounds an alarm signal when the peak torque exceeds a preset level. A display displays the minimum and maximum detected signal levels.

Still other preferred embodiments include an averaging circuit which produces a long term average of the low pass filter output signal which is calculated over at least one refrigeration cycle of the cryopump.

Other preferred embodiments include a power factor transducer which generates an output signal representative of the Power Factor of the electrical power input to the cryopump motor. The Power Factor transducer includes a phase detector which detects the phase difference between the input voltage and the input current applied to the cryopump motor, and generates an output signal representative of the Power Factor angle. Peak detector circuits sample the Power Factor angle and compare these samples with prior samples to detect the minimum and maximum Power Factor angles.

Thus, the present invention utilizes maximum average power, long term average power, or Power Factor measurements as an indication of mechanical load on a synchronous cryopump motor. The invention has the advantage of non-invasively detecting motor overload or ratcheting in synchronous motors which would otherwise occur with little warning since changes in motor load from mechanical distress or contamination cause little observable change in motor current. The invention advantageously warns the operator when the cryopump motor approaches overload so that maintenance or repair can be performed before excessive motor load causes refrigerator malfunction.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
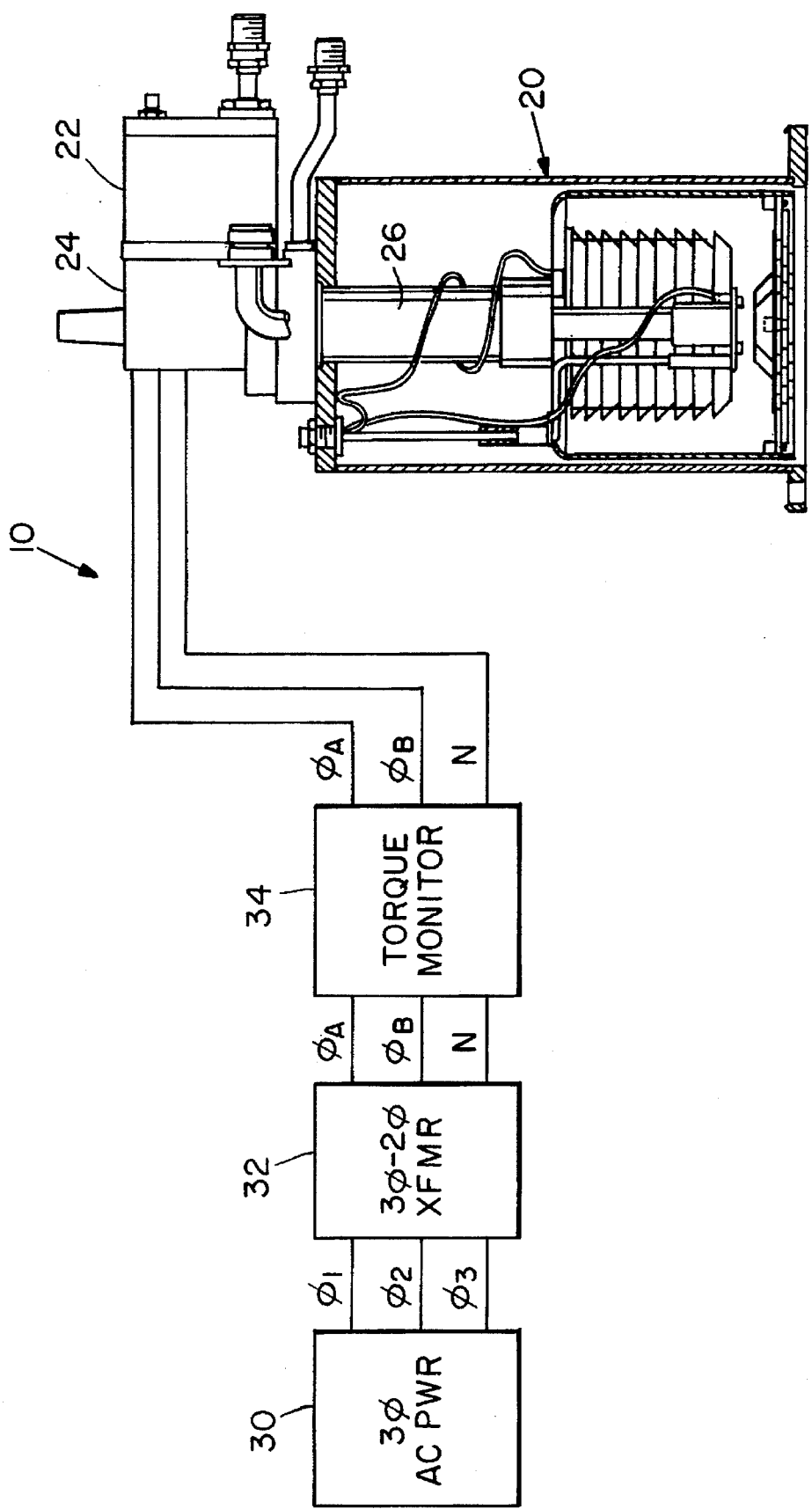
FIG. 1 is a schematic diagram of a cryogenic refrigeration system utilizing the motor load monitor of this invention.

FIG. 1 illustrates an embodiment of a cryogenic refrigerator system 10 featuring the torque monitor of this invention for testing and monitoring the operation of the refrigerator system. In particular, the torque monitor may be used to test the refrigeration system at the manufacturing stage, as well as for monitoring the ongoing operation of the system on an intermittent or continuous basis. A historical record may be kept of the cryogenic refrigerator's operation and may be used to determine when service is required, especially before a failure occurs. Further, the torque monitor may be used to evaluate the effectiveness of a particular service routine performed on the system. For instance, when service is indicated by the monitor, it may be easiest and most cost effective to replace the helium refrigerant first, rather than tear down the system to inspect for mechanical wear. Once the helium is replaced, the torque monitor will show if the system is, or is not, again operating normally and whether further service is required. Still further, the data gathered by the torque monitor may be accessed remotely by service personnel, e.g., by a computer modem, and allow diagnosis of the refrigeration system without a service call.

The cryogenic refrigerator system includes a cryopump 20 having a synchronous two-phase rotary drive motor 22 and a crosshead assembly 24. Three-phase, five-phase, or other multi-phase drive motors may also be used. The crosshead assembly 24 converts the rotary motion of motor 22 to reciprocating motion to drive a displacer within a two stage cold finger 26. An example of an electronically controlled cryopump suitable for use in this cryogenic refrigerator system is disclosed in U.S. Pat. No. 4,918,930, assigned to the assignee of this invention, and hereby incorporated by reference.

Synchronous two-phase cryopump motor 22 is powered from a three phase AC power source 30 which produces three phase power on lines $\Phi_1$, $\Phi_2$, and $\Phi_3$. The three phase-power on lines $\Phi_1$, $\Phi_2$, and $\Phi_3$ is transformed to two-phase power by a three phase-to-two phase transformer 32 having outputs $\Phi_A$, $\Phi_B$ and N (neutral). Two-phase power lines $\Phi_A$, $\Phi_B$ and N pass through a torque monitor 34 which samples the power drawn from these lines by synchronous motor 22 to thereby monitor the torque load on the motor.

Figure 2:
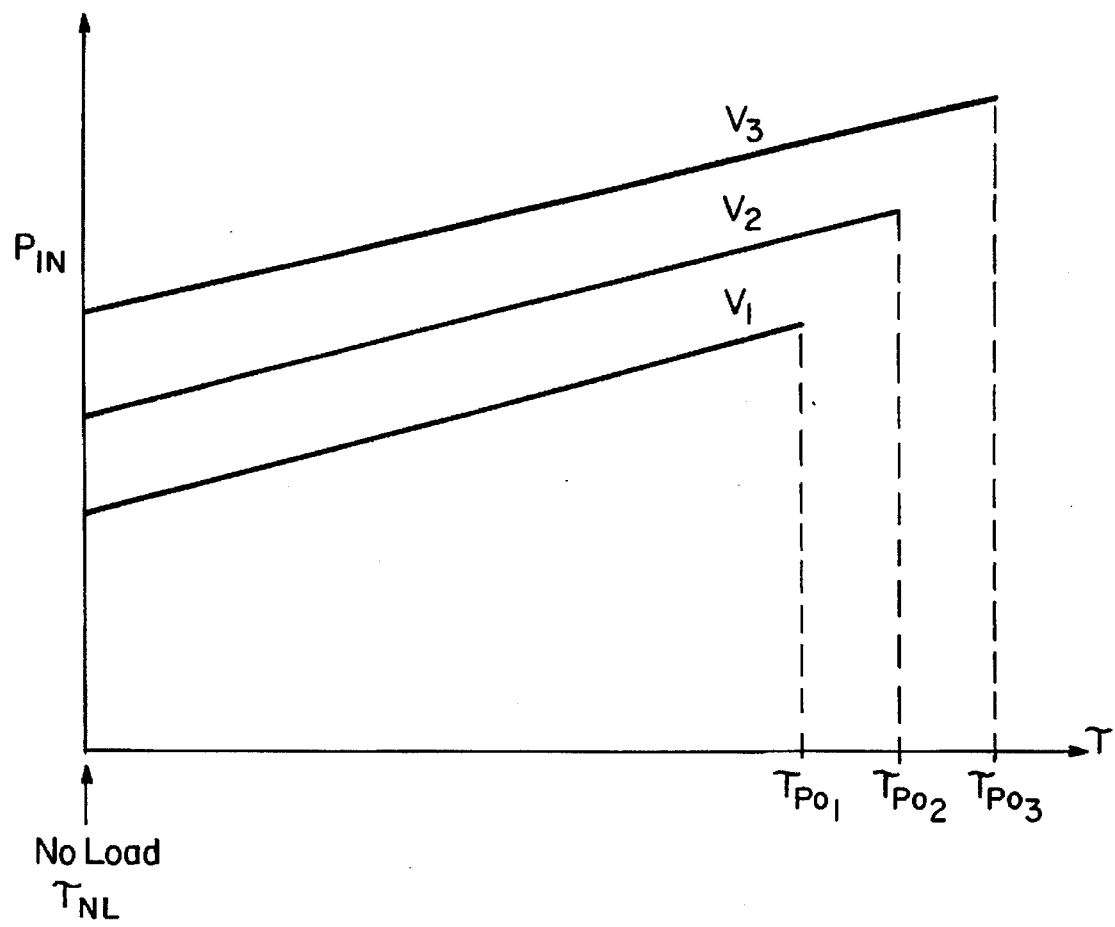
FIG. 2 is a plot showing the relationship between the input power and torque developed by the cryopump motor of the refrigeration system of FIG. 1.

FIG. 2 shows the relationship between total power input to the motor $P_{IN}$ (vertical axis) versus the torque load on the motor $\tau$ (horizontal axis) for increasing motor input power-line voltages $V_1$, $V_2$, and $V_3$, at a given powerline frequency, i.e., 60 Hz. It is apparent from this graph that the total input power $P_{IN}$ to the motor increases approximately linearly with increasing torque load $\tau$ for a given input powerline voltage, from a quiescent power level $P_{NL}$ corresponding to "no load" torque $\tau_{NL}$ to a maximum power level $P_{MAX}$ corresponding to "pull-out" torque $\tau_{PO}$ for each input voltage. Mathematically, the total input power is given by $$P_{IN} = P_{NL} + P_\tau \tag{1}$$

where $P_\tau$ is the electric power converted into mechanical torque. That is, $P_{NL}$ is the power component responsible for the vertical offset of each power curve, and $P_\tau$ is the power component responsible for the slope of each power curve. Thus, input power $P_{IN}$ is the power $P_\tau$ required to produce mechanical torque in the motor $P_\tau$ offset by the quiescent "no load" power $P_{NL}$.

The quiescent "no load" power $P_{NL}$ is the sum of resistive power losses $P_{I2R}$ and magnetic power losses $P_{Fe}$ in the iron of the motor, and is given by $$P_{NL} = P_{I2R} + P_{Fe} \tag{2}$$

It is apparent from Equation (2) that these quiescent power losses depend on the input voltage to the motor and account for the offsets between the $V_1$, $V_2$, and $V_3$ power curves of FIG. 2.

The torque power component $P_\tau$ required to produce mechanical torque in the motor is responsible for the linearly increasing portion of the curves of FIG. 2. The slope of these curves are essentially the same, indicating that a resulting change in power component $P_\tau$ caused by a change in mechanical torque $\tau$ is independent of the input voltage to the motor. Mathematically, the torque power component $P_\tau$ is given by $$P_\tau = V_p\cos(\omega t) I_p\cos(\omega t + \alpha) - P_{NL} \tag{3}$$

$$= \frac{V_p I_p \cos(2\omega = t + \alpha)}{2} + \frac{V_p I_p \cos(\alpha)}{2} - P_{NL} \tag{4}$$

where $V_p$ is the peak motor input voltage, $I_p$ is the peak motor input current, $\omega$ is the angular frequency of the power source (i.e., $\omega = 2\pi f$, where $f = 60$ Hz), and $\alpha$ is the phase angle between the input voltage and input current. If we ignore the high frequency power term at $2\omega t$, which appears as a 120 Hz sinusoidal ripple having an average value of zero, the average power at any instant during the refrigeration cycle is given by the second term of the Equation (4), $(\frac{1}{2}) V_p I_p \cos(\alpha)$, where $\cos(\alpha)$ represents the familiar Power Factor (PF). Due to the linear relationship between mechanical torque $\tau$ and torque power component $P_\tau$, the average mechanical torque load $\tau$ at any instant in the refrigeration cycle is proportional to the second and third terms of the Equation (4). That is, $$\tau \propto \left( \frac{V_p I_p \cos(\alpha)}{2} - P_{NL} \right). \tag{5}$$

Figure 3:
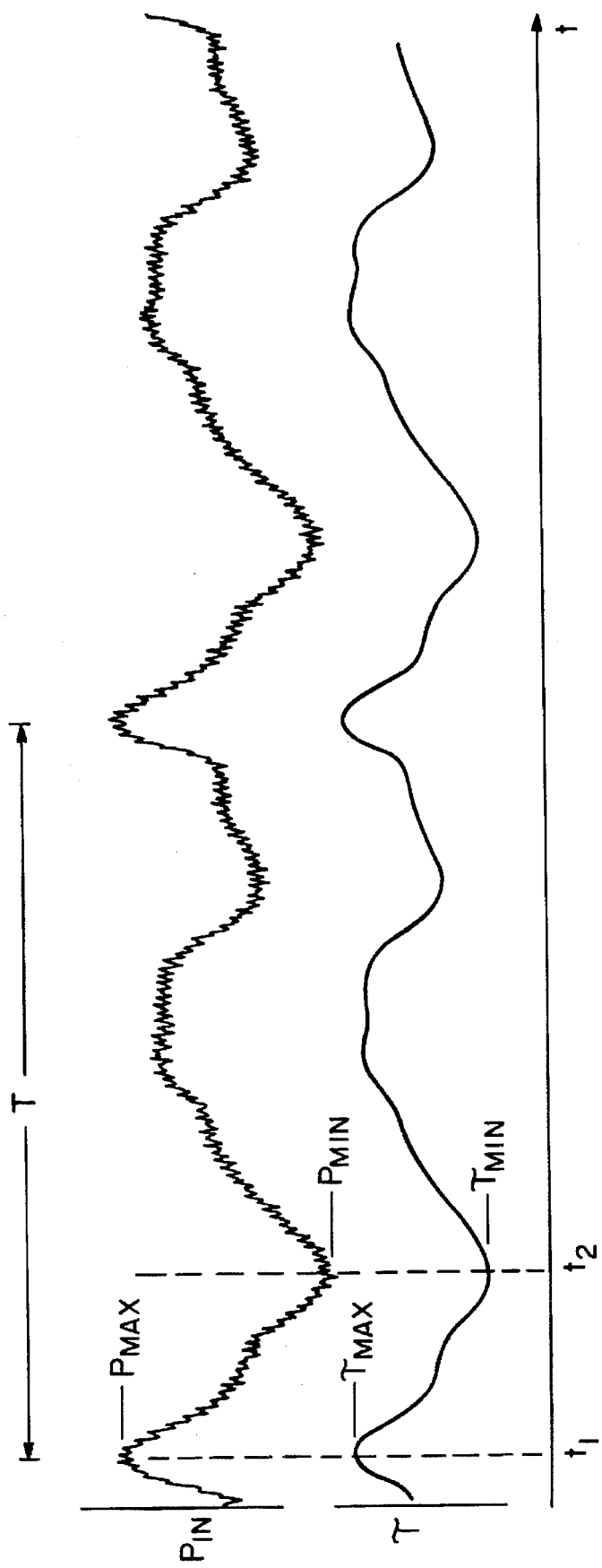
FIG. 3 is a plot of measured motor input power and torque variations over several refrigeration cycles for the refrigeration system of FIG. 1.

FIG. 3 shows the relationship between the power input to the motor and the torque $\tau$ generated by the motor over several refrigeration cycles. The upper trace shows the measured electrical power $P_{IN}$ input to the synchronous motor 22 over each refrigeration cycle, filtered to remove most of the 120 Hz ripple, and thus represents the average power input to the motor which varies over each refrigeration cycle. Each refrigeration cycle has a period of T seconds, where 1/T is approximately 1.2 Hz. The lower trace shows the corresponding torque $\tau$ generated in the motor over each refrigeration cycle.

A power maximum $P_{max}$ corresponding to the maximum generated torque $\tau_{max}$ occurs at time $t_1$ of the refrigeration cycle. $\tau_{max}$ corresponds to the maximum motor load which occurs at the displacer-regenerator middle position just before the minimum contained gas volume condition is attained. A power minimum $P_{min}$ corresponding to the minimum generated torque $\tau_{min}$ occurs at time $t_2$ of the refrigeration cycle and is equivalent to the "no load" torque of the motor. $\tau_{min}$ corresponds to the minimum motor load which approaches zero at the ends of displacer-regenerator stroke when the gas volume is minimum or maximum.

Dynamometer tests on synchronous motor 22 show that the linear relationship between load minus no load motor input power and torque is independent of applied motor voltage and motor winding temperature rise. Tests also show that the minimum motor input power during the 1.2 Hz cryogenic refrigerator cycle corresponds to no load under a wide variety of refrigerator operating conditions. Thus, the maximum acceptable motor load is a function of operating conditions and increases with increasing motor input voltage or with decreasing motor winding temperature. Peak to peak detection of the motor load input power, i.e., subtraction of the $P_{min}$ from the $P_{max}$ motor load input power values, provides a peak motor load value which is proportional to motor load and which does not vary with motor input voltage or winding temperature. This is particularly true with regard to the cryopump refrigeration cycle since the motor approaches a no torque load condition, corresponding to $P_{min}$, during each refrigeration cycle.

Figure 4:
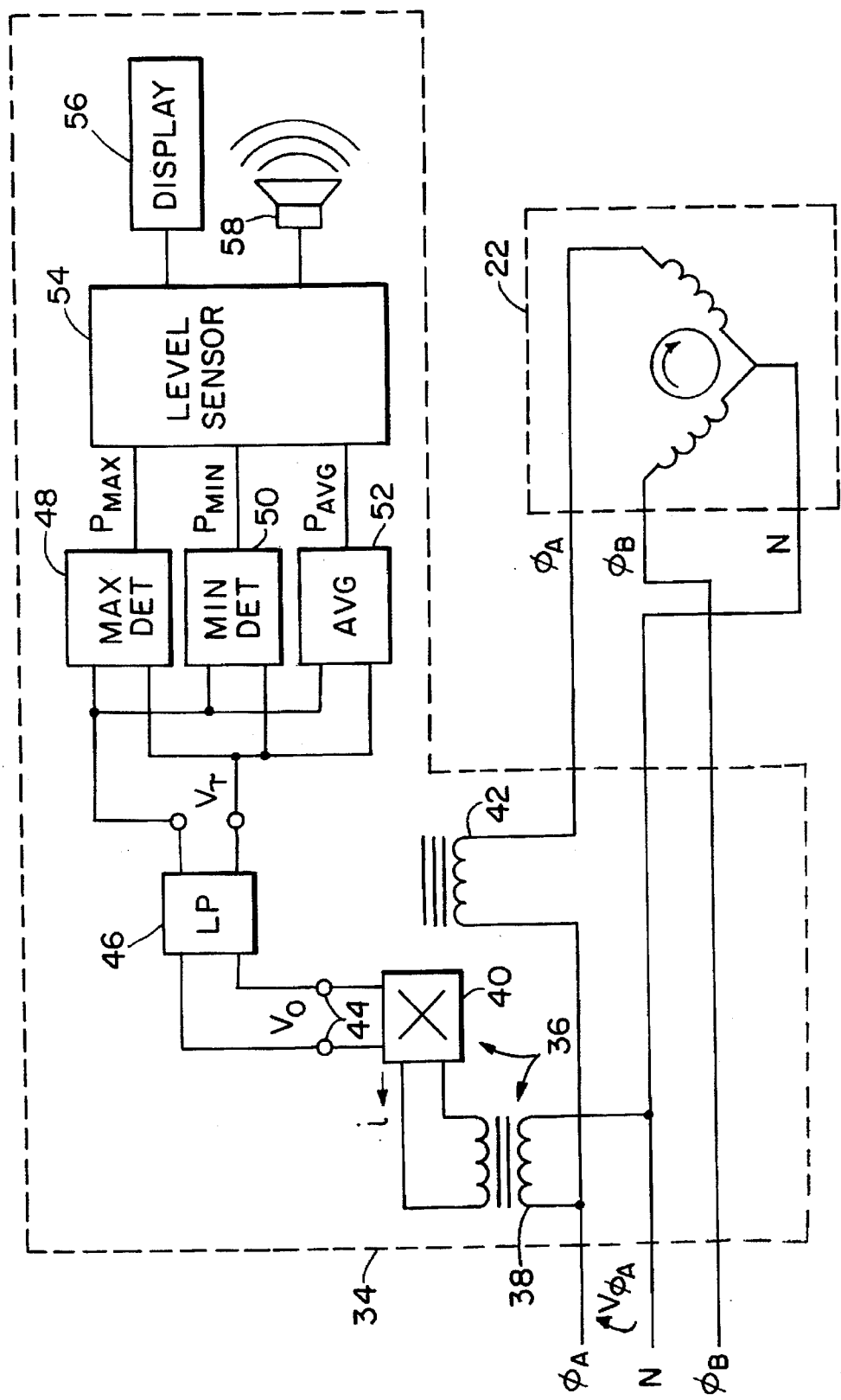
FIG. 4 is a schematic diagram of an embodiment of the motor load monitor of this invention which measures input power to the cryopump motor of FIG. 1.

FIG. 4 shows one embodiment of torque monitor 34 (FIG. 1) which monitors the power input to motor 22, and thus the mechanical torque. Torque monitor 34 uses a Hall-effect multiplying power transducer 36 connected to monitor the current and voltage of one phase of the two-phase power source, in this case $\Phi_A$. The power drawn from the $\Phi_B$ power line is assumed to be identical to the power drawn from the $\Phi_A$ power line, and thus need not be monitored separately. (This also holds true for other multi-phase drive motors, e.g., three-phase or five-phase, so only one phase of the multi-phase power line needs to be monitored in those cases). A step-down transformer 38 of the power transducer is connected across the $\Phi_A$ and N power lines to sample the input voltage to the motor. A magnetic field generator 42 of the power transducer is connected in series with the $\Phi_A$ power line to sample the input current to the motor. The power transducer multiplies the motor input voltage amplitude by the motor input current amplitude to provide an instantaneous input volt-amp (vi) signal indicative of the instantaneous power input to the motor. Suitable power transducers are commercially available from F. W. Bell, 8120 Hanging Moss Rd., Orlando, Fla. 32807, as the series PX-2000 transducers.

The power transducer outputs a voltage signal $V_o$ across terminals 44 which represents the vi signal, i.e., the total motor input power $P_{IN}$ as described by Equations (1) through (4) above (actually only ½ the total input power is sampled since only one phase is monitored). As discussed above, for a 60 Hz AC line motor input voltage the $P_\tau$ component of the vi signal representing $P_{IN}$ has a 120 Hz ripple with zero average value superimposed on an average voltage level corresponding to the average electrical input power which varies with the required torque over each refrigeration cycle.

A DC averaging circuit or low pass filter 46 having a 100 millisecond averaging time is connected to the output terminals 44 of the power transducer and suppresses the 120 Hz modulation on the vi signal to provide a motor torque load signal $V_\tau$ which is linearly related to the instantaneous motor load torque $\tau$. Motor load torque signal $V_\tau$ is then monitored with a maximum peak detector 48, a minimum peak detector 50, and an averaging circuit 52. Maximum peak detector 48 provides a $P_{max}$ output signal indicative of the maximum motor load torque generated. Minimum peak detector 50 provides a $P_{min}$ output signal indicative of the "no load" input power to the motor. Average power detector 52 provides a $P_{ave}$ output signal indicative of the input power to the motor averaged over several refrigeration cycles, which is also an indication of motor load. The $P_{max}$, $P_{min}$, and $P_{ave}$ signals are input to a level sensor circuit 54 which provides various functions, such as displaying the values on a display 56, or triggering an alarm 58 when the maximum torque load approaches motor capacity.

Level sensor circuit 54 may also monitor the difference between $P_{max}$ and $P_{min}$ during the refrigerator cycle to obtain measure of motor load which is insensitive to motor operating voltage and winding temperature.

Instrumentation such as an oscilloscope or a digital volt meter (DVM) may also be used to monitor the $V_o$ signal output from the power transducer 36 on terminals 44. For instance, commercially available DVMs have an internal DC averaging circuit to suppress the 120 Hz ripple, MIN and MAX capture functions to display the $P_{min}$ and $P_{max}$ signal levels, respectively, and a long term averaging function to display $P_{ave}$.

Figure 5:
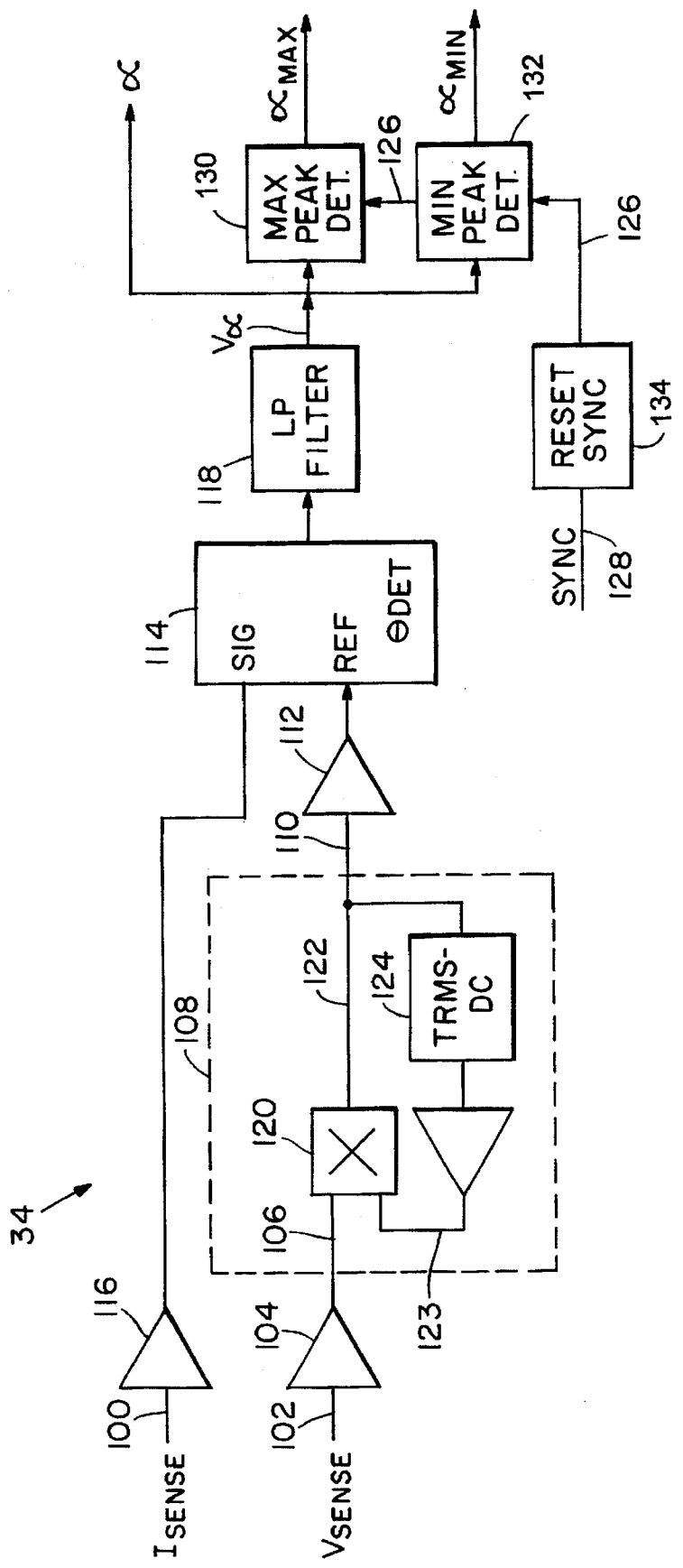
FIG. 5 is a schematic diagram of another embodiment of the motor load monitor of this invention which measures the Power Factor of the input power to the cryopump motor of FIG. 1.

FIG. 5 shows another embodiment of a torque monitor 34 (FIG. 1) which monitors the Power Factor of the power input to motor 22. Increasing mechanical load on a synchronous motor results in an increasing magnetization angle between stator and rotor from a minimum of 0°, where minimum motor torque is available, to a maximum out-of-phase condition of 90° where the maximum or pull-out torque is being provided by the motor. This results in an increase in the input current lag from the input voltage applied to the motor as the motor load increases, i.e., the power factor angle $\alpha$ increases with increasing torque load. This corresponds to increasing electromagnetic power converted into mechanical power by the motor to supply the mechanical refrigerator load and motor mechanical losses.

One input to torque monitor 34 on line 100 is an $I_{sense}$ voltage signal which is proportional to the motor input current, and may be generated, for instance, by a low resistance sense resistor placed in one phase of the motor power supply, e.g., the $\Phi_A$ power line. The other input to the torque monitor on line 102 is a $V_{sense}$ voltage signal proportional to the motor input voltage on the same power line as the sampled input current. The $V_{sense}$ signal is input through a level shifter 104, i.e., an amplifier or attenuator, whose output on line 106 is applied to an AGC circuit 108. AGC circuit 108 includes a multiplier 120 which multiplies the output of level shifter 104 by a feedback signal on line 123 representing the true RMS value of the multiplier output on line 122. A DC voltage representing the true RMS value of the signal on line 122 is generated by a true RMS to DC convertor 124. A suitable multiplier is commercially available from Analog Devices, as Model Number AD534. A suitable RMS to DC convertor is also available from Analog Devices as Model Number AD536.

AGC circuit 108 provides an output voltage signal on line 110 which is in-phase with the $V_{sense}$ signal and has a fixed peak-to-peak reference amplitude. The voltage signal on line 110 is passed though another level shifter 112 and input to the REF input of a phase detector 114. The $I_{sense}$ signal on line 100 is passed through a level shifter 116 and input to the SIG input of the phase shifter. A suitable phase detector may be configured from a balanced modulator commercially available from Analog Devices as Model Number AD630.

The output of phase detector 114 is a voltage proportional to the phase difference between the $I_{sense}$ and $V_{sense}$ signals, i.e., proportional to the power factor angle $\alpha$. The phase detector output is passed through a low pass filter 118 to remove the high frequency ripple components, and provide an output voltage $V_\alpha$ proportional to the power factor angle. The $V_\alpha$ signal is applied to the input of a MAX Peak Detector 130 and a MIN Peak Detector 132 which compares the signal with prior levels during the sampling period to determine the maximum and minimum measured Power Factor angles, respectively. MAX Peak Detector 130 outputs an $\alpha_{max}$ signal and MIN Peak Detector 132 outputs an $\alpha_{min}$ signal, each indicative of the result of the respective comparison. A reset circuit 134 receives a sync pulse on line 128 which indicates the start of a refrigeration cycle sample period and in response produces a reset pulse on line 126 to reset the MAX and MIN Peak Detectors so that they begin a new comparison cycle.

While this invention has been particularly shown and described with reference to preferred embodiments thereof, it will be understood by those skilled in the art that various changes in form and details may be made therein without departing from the spirit and scope of the invention as defined by the appended claims. For instance, the present invention may be applied to a linear motor using the power measurements to indicate linear force produced by the motor which is analogous to torque produced by a rotary motor. Further, the invention may be incorporated into a control mechanism using power measurements to control the energy applied to the motor and, for instance, automatically changing or halting the refrigeration cycle when the motor torque approaches a critical level. Still further, other technologies such as digital signal processors (DSP), e.g., the TMS320 family of DSPs commercially available from Texas Instruments, may be used to monitor the power and power factor of the cryopump motor.

We claim:

1. A method for monitoring and detecting internal degradation of a cryogenic refrigerator, comprising the steps of
monitoring the electrical power input to a motor which drives a displacer of the cryogenic refrigerator, and
relating the power input to the internal degradation including mechanical wear and refrigerant contamination of the cryogenic refrigerator.

2. The method of claim 1 wherein the monitoring step includes measuring the electrical power input to the cryopump and displaying the power input to show instantaneous power consumption of the motor.

3. The method of claim 1 wherein the monitoring step includes measuring the electrical power input to the motor and displaying the power input averaged over time.

4. The method of claim 3 wherein the monitoring step includes
measuring the maximum average of the electrical power,
measuring the minimum average of the electrical power, and
subtracting the minimum average of the electrical power from the maximum average of the electrical power to determine a torque load on the motor which is insensitive to an operating voltage and a temperature of windings of the motor.

5. The method of claim 1 wherein the monitoring step includes measuring a power factor of the power input to the cryopump motor.

6. A cryopump, comprising:
a displacer for moving a working fluid through a regenerator;
a motor for driving the displacer;
a torque monitoring device for generating a torque signal indicative of a torque generated by the motor; and
a display device for providing a visual display of the torque generated by the motor in response to the torque signal.

7. A cryopump as claimed in claim 6, further comprising an audible alarm device for generating an audible signal to a user in response to the torque signal being indicative of the torque exceeding a threshold level of torque.

8. A cryopump comprising:
a displacer for moving a working fluid through a regenerator;
a motor for driving the displacer; and
a torque monitoring device for generating a peak torque signal indicative of a peak torque generated by the motor during duty cycles of the displacer.

9. A cryopump as claimed in claim 8, further comprising a display device for providing a display of the peak torque during the duty cycles in response to the peak torque signal.

10. A cryopump as claimed in claim 9, further comprising an alarm for generating an audible signal in response to the peak torque signal exceeding a predetermined threshold.

11. A cryopump as claimed in claim 8, further comprising a display device for indicating contamination of the working fluid in response to the peak torque signal.

12. A cryopump as claimed in claim 8, further comprising an alarm for generating an audible signal indicating levels of working fluid contamination of the working fluid in response to the peak torque signal exceeding a threshold value.

13. A cryopump as claimed in claim 8, wherein the torque monitoring device comprises a power transducer for generating a transducer signal indicative of an electrical power input to the motor.

14. A cryopump as claimed in claim 13, wherein the torque monitoring device further comprises a low pass filter for filtering the transducer signal to produce a low pass filtered signal representative of average electrical power input to the motor.

15. A cryopump as claimed in claim 14, wherein the torque monitoring device further comprises a maximum signal detector for detecting the peak torque of the motor for each duty cycle in response to the low pass filtered signal and a synchronizing signal indicative of the duty cycles.

16. A cryopump as claimed in claim 15, wherein the torque monitoring device further comprises a minimum signal detector for detecting a minimum torque of the motor for each duty cycle in response to the low pass filtered signal and the synchronizing signal.

17. A cryopump as claimed in claim 16, further comprising an averaging circuit for producing average of the torque produced by the motor in response to the low pass filtered signal.

18. A cryopump as claimed in claim 17, further comprising a reset circuit for resetting the maximum signal detector and the minimum signal detector in response to the synchronizing signal to begin a new comparison cycle.

19. A cryogenic refrigerator as claimed in claim 8, wherein the torque monitoring device monitors the torque by measuring power consumed by the motor.

20. A method for detecting refrigerant contamination in a cryopump including a displacer for moving a refrigerant through a regenerator, a motor, a crosshead for converting rotary motion of the motor into linear motion for driving the displacer, and a torque monitoring device for detecting torque generated by the motor, the method comprising:
monitoring the torque of the motor during a current duty cycle of the displacer;
comparing the monitored torque to the torque generated by the motor during a previous duty cycle of the displacer; and
generating signal to a user indicating the presence of contamination in the refrigerant in response to the comparison of the torque generated by the motor during the present duty cycle and the previous duty cycle.

* * * * *